United States Patent
Agrawal et al.

(10) Patent No.: US 8,116,450 B2
(45) Date of Patent: Feb. 14, 2012

(54) SYSTEM AND METHOD FOR UTILITY SAMPLING FOR TRUST METRICS IN PKI

(75) Inventors: Dakshi Agrawal, Monsey, NY (US); Charanjit Singh Jutla, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 12/243,432

(22) Filed: Oct. 1, 2008

(65) Prior Publication Data

US 2010/0082493 A1    Apr. 1, 2010

(51) Int. Cl.
*H04L 9/00*    (2006.01)
(52) U.S. Cl. ............... 380/30; 380/280; 705/4; 705/44; 705/71; 705/76; 709/201; 709/241; 713/155; 713/156; 713/157; 713/170; 713/175
(58) Field of Classification Search ............... 380/30, 380/280; 705/71, 4, 76, 44, 229, 201; 709/241, 709/209; 713/155–157, 170, 175
See application file for complete search history.

(56) References Cited

U.S. PATENT DOCUMENTS

2002/0156747 A1 * 10/2002 Reiter et al. ............ 705/76

OTHER PUBLICATIONS

Agrawal et al., "Utility Sampling for Trust Metrics in PKI", May 20, 2007, http://eprint.iacr.org/2007/178.*
Michael K. Reiter, et al., "Toward Acceptable Metrics of Authentication," IEEE Security and Privacy 1997.
Audun Josang, "A Logic for Uncertain Probabilities," International Journal of Uncertainty, Fuzziness and Knowledge-Based Systems, vol. 9, No. 3 (Jun. 2001).

* cited by examiner

*Primary Examiner* — Vivek Srivastava
*Assistant Examiner* — Hee Song
(74) *Attorney, Agent, or Firm* — F. Chau & Associates, LLC; Louis J. Percello, Esq.

(57) ABSTRACT

A method for measuring trust in a transaction over a public key certificate network includes associating each edge $K_A \rightarrow K_B$ of an public key certificate network connecting two public keys $K_A$ and $K_B$ with a probability p that information about $K_B$ is reliable, and a confidence c that is a total dollar amount of transactions which have involved using edge $K_A \rightarrow K_B$. One or more authentication paths are formed in the public key certificate network starting from public key $K_S$ and ending with a target public key $K_T$. A limit l of an amount of insurance that an owner of $K_S$ is willing to provide to a user interested in a transaction with an owner of $K_T$ is calculated, and for each amount m<l, a premium for which the owner of $K_S$ is willing to sell insurance to the user for an amount of m is calculated.

22 Claims, 3 Drawing Sheets

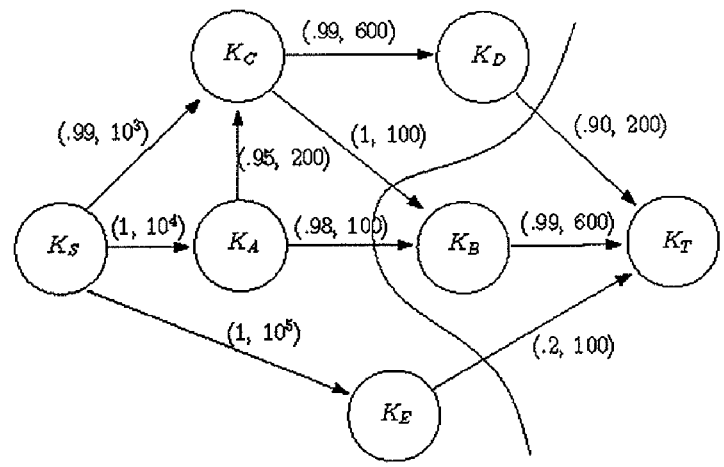
Fig. 1. The New Metric
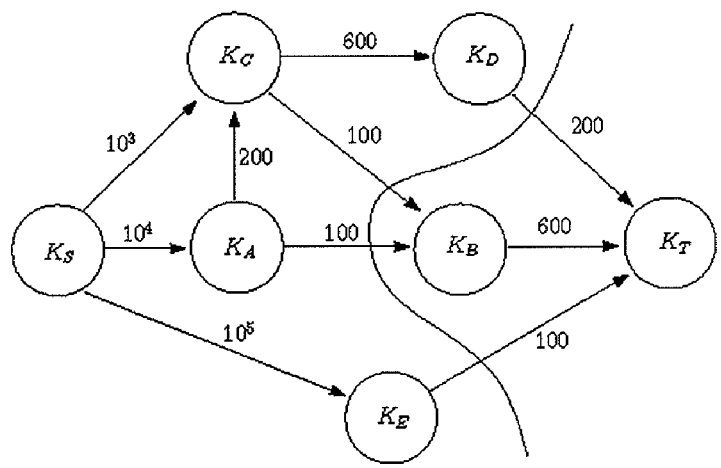
Fig. 2. The Reiter-Stubblebine Metric

SYSTEM AND METHOD FOR UTILITY SAMPLING FOR TRUST METRICS IN PKI

STATEMENT REGARDING FEDERALLY SPONSORED RESEARCH OR DEVELOPMENT

This invention was made with Government support under Contract No.: W911NF-06-3-0001 awarded by Army Research Office (ARO). The Government has certain rights in this invention.

BACKGROUND

1. Technical Field

This disclosure is directed to a new trust metric for a network of public key certificates.

2. Discussion of Related Art

In any networked situation, trust in entities, especially business entities with which a user may have monetary transactions, is a challenging issue. Consider the case of the public key infrastructure (PKI), where a reputed entity called certificate authority (CA) authenticates, usually via a chain of public key authentications, a target entity's public key and other information about the target entity. This, however, requires a user's implicit trust in the CA's ability to associate the "other information" with the target public key. As the authentication of the target public key is done via a chain of authentications, a similar trust in the ability of intermediaries in associating information about the next entity in the chain with the public key of the next entity is required. On top of this, the user must trust CA's public key. Although this last trust may be justified, hinted by the fact that the CA is a reputed entity, the trust in other entities in the chain of authentications is never perfect.

Thus, a user is inevitably led to determine the net trust it can place in the full chain of authentications, usually by various algebras on trust metrics. Moreover, this net trust, or the utility of this trust, also depends on the kind of information that was authenticated. For example, if the information in a certificate authenticates a public key with a business name and its web address, then the user's net trust determined by such algebras is only about the public key being associated with the business name. The user must independently determine how much it trusts the business name being a bona-fide business. On the other hand, if the certificate also authenticates, along with the above information, that the business has a five star service quality, then the user is more inclined to trust the business.

A simplistic trust metric is used in PGP (Pretty Good Privacy). However, it does not address the situation where fictitious copies of entities are created just to boost the trust of a certain entity. Even in the context of PKI, various trust metrics have been proposed. Of particular importance is the work of Reiter and Stubblebine, "Toward Acceptable Metrics of Authentication", Proc. IEEE Symp. on Security and Privacy, 1997, the contents of which are herein incorporated by reference in their entirety, who proposed a set of eight principles which a good trust metric should follow. Reiter and Stubblebine also proposed a metric which claimed to follow these principles. As one of the more important principles, they had required that the metric's output should be intuitive and relevant to the authentication decision. Following this principle, in their solution, a metric can be computed which represents the amount for which the information bound to the target public key is insured. Another important principle states that the metric should be resilient to modifications of the model by misbehaving parties. Since their metric computes a minimum insured value regardless of misbehavior of all parties (except the root), this principle is satisfied.

Although, this metric is useful to a user, and also remedies many other issues with earlier metrics, it has some drawbacks: (a) it does not tell the user what the premium for the insurance is, (b) it does not model how the insurance amounts were determined, and (c) it forces the user to deal with all entities in the network for insurance claims. Although, the drawbacks (b) and (c) may really be implementation issues, drawback (a) may be of real concern, and actually violates one of their principles, namely "the metric should take into account as much information as possible that is relevant to the authentication decision that the user is trying to make".

BRIEF SUMMARY

Exemplary embodiments of the invention as described herein generally include methods and systems for a new trust metric for a network of public key certificates, e.g. as in PKI, which allows a user to buy insurance at a fair price on the possibility of failure of the certifications provided while transacting with an arbitrary party in the network. A method according to an embodiment of the invention combines a trust metric based on belief functions and an insurance metric proposed by Reiter and Stubblebine which addresses various practical aspects of trust algebras. A method according to an embodiment of the invention provides a final metric that allows a user to determine the insurance premium, but also allows the user to insure to any amount of his or her choice, up to a limit. Further, this limit is part of a metric according to an embodiment of the invention. Thus, rather than the insurance amount, a metric according to an embodiment of the invention reflects the cost of insurance per dollar amount, and an upper limit on the applicability of this rate. This upper limit corresponds to the mean and variance of the trust value viewed as a belief function. Thus, a metric according to an embodiment of the invention, while satisfying all the principles of Reiter and Stubblebine, further addresses issues raised by proponents of "trust as belief functions", where a belief function is not just a single probability value, but one which also incorporates uncertainty. This allows for the computation of insurance premiums.

A trust metrics according to an embodiment of the invention is modeled on a simple and intuitive theory of "utility sampling". A metric according to an embodiment of the invention can be used in a reputation system as well, where the reputation of the agents is viewed as a currency in lieu of monetary amounts involved in insurance based systems. In many contexts, including Internet commerce, reputation has become an alternative currency. In this viewpoint, an end-user never buys insurance, but a failure to deliver results in a loss of reputation of that agent. A trust metric according to an embodiment of the invention, which is an insurance rate and an upper limit, then becomes a reputation rating along with a variance (or confidence value). A loss of reputation leads to an appropriate adjustment of these metrics, and a model based on "utility sampling" enables exactly that, while satisfying the Reiter-Stubblebine properties. A metric according to an embodiment of the invention conserves all the beneficial properties of the latter over other schemes, including protecting the user from unintentional or malicious dependencies in the network of certifications.

According to an aspect of the invention, there is provided a method for measuring trust in a transaction over a public key certificate network, including providing a public key certificate network comprising a directed acyclic graph whose nodes are public keys and where an edge $K_A \rightarrow K_B$ implies an owner of public key $K_A$ is in possession of a certificate for public key $K_B$, associating each edge $K_A \to K_B$ of the public key certificate network connecting two public keys $K_A$, owned by A, and $K_B$, owned by B, with a probability p, according to A, that information about $K_B$ is reliable, and a confidence c that is a total dollar amount of transactions which have involved using edge $K_A \to K_B$, forming one or more authentication paths in the public key certificate network starting from a certificate authority having public key $K_S$ and ending with a target public key $K_T$, calculating a limit l on an amount of insurance that an owner of $K_S$ is willing to provide to a user interested in a transaction with an owner of $K_T$, and for each amount m<l, calculating a premium for which the owner of $K_S$ is willing to sell insurance to the user for an amount of m.

According to a further aspect of the invention, the probability p and confidence c associated with each edge $K_A \to K_B$ are calculated using utility sampling.

According to a further aspect of the invention, using utility sampling comprises A acquiring over a time interval r positive observations and s negative observations of a reliability of information provided by B, where the edge probability $$p = \left(\frac{r+1}{r+s+2}\right)$$

and the edge confidence c=r+s.

According to a further aspect of the invention, a total probability associated with an authentication path that terminates at the target key $K_T$ is a product of the probability of each edge in the authentication path, and a total confidence associated with the authentication path that terminates at the target key $K_T$ is a minimum value of the confidence values associated with each edge of the authentication path.

According to a further aspect of the invention, calculating the limit l on an amount of insurance for the one or more authentication paths ending with target public key $K_T$ comprises calculating a maximum $K_S$-$K_T$ flow f in the directed graph, with a flow capacity on each edge being the c value of the edge.

According to a further aspect of the invention, calculating a premium for each amount m<l comprises calculating a maximum amount insurable, $f_i$, for each authentication path, calculating an insurance premium rate $s_i$ for each authentication path, sorting the authentication paths in increasing order of rate $s_i$, where the authentication paths are labeled $P_1$ to $P_n$ in increasing order of rate $s_i$, where n is a number of authentication paths, and calculating the premium for the amount m<l from the sorted premium rates $s_i$.

According to a further aspect of the invention, calculating the premium for the amount m<l comprises insuring a first $f_j$ dollars out of m according to $P_j$ using rate $s_j$, and insuring subsequent amounts using each successive path $P_i$ using rate $s_i$ until all m dollars are allocated.

According to a further aspect of the invention, calculating the premium for the amount m<l comprises insuring a first $f_j$ dollars out of m at an average premium rate over all paths $P_j$, and insuring subsequent amounts an average premium rate excluding a rate associated with the amount already insured, until all m dollars are allocated.

According to a further aspect of the invention, calculating an insurance premium rate $s_i$ for an authentication path comprises calculating, for each public key node in the authentication path, starting at $K_S$, $s_i$ from a formula $(s_i - a_i)p_i - (1-\delta_i)(1-p_i) = \gamma$, where $s_i$ is the selling price of the premium, $a_i$ is an amount that S, the owner of $K_S$, pays to A, the owner of $K_A$ for insuring $\delta_i$ fraction of the amount, and $\gamma$ is a fraction expected profit per transaction expected by S, and where for each subsequent public key node $A_i$ in the authentication path, the associated $s_i$ will be the $a_i$ paid from $A_i$'s predecessor node and the $a_i$ will be the amount paid to $A_i$'s successor node.

According to a further aspect of the invention, the method comprises providing a list $K_{T1}, \ldots K_{ti}, \ldots, K_{Tn}$ of all public keys that B is attesting, where $(p_i, c_i)$ are the (p, c) values estimated by B about $K_{Ti}$, having A attest $T_i$ for each i via B after a time period using $\Delta c_i$ additional samples where $\Delta r_i$ of the samples show positive behavior by $T_i$, and updating the probability associated with each edge $K_A \to K_B$ from $$p_{K_A \to K_B} \leftarrow \frac{p_{K_A \to K_B} + \sum_i \Delta c_i \left(1 - \left|1 - \frac{\Delta r_i p_i}{\Delta c_i}\right|\right)}{c_{K_A \to K_B} + \sum_i \Delta c_i},$$

and the confidence associated with each edge $K_A \to K_B$ from $$c_{K_A \to K_B} \leftarrow c_{K_A \to K_B} + \sum_i \Delta c_i.$$

According to another aspect of the invention, there is provided a method for measuring trust in a transaction over a public key certificate network, including providing a public key certificate network comprising a directed acyclic graph whose nodes are public keys and where an edge $K_A \to K_B$ implies an owner of public key $K_A$ is in possession of a certificate for public key $K_B$, associating each edge $K_A \to K_B$ of the public key certificate network connecting two public keys $K_A$, owned by A, and $K_B$, owned by B, with a probability p, according to A, that information about $K_B$ is reliable, and a confidence c that is a total dollar amount of transactions which have involved using edge $K_A \to K_B$, using utility sampling to estimate p and c by having A acquire over a time interval r positive observations and s negative observations of a reliability of information provided by B, where the edge probability $$p = \left(\frac{r+1}{r+s+2}\right)$$

and the edge confidence c=r+s, forming one or more authentication paths in the public key certificate network starting from a certificate authority having public key $K_S$ and ending with a target public key $K_T$, where a total probability associated with an authentication path that terminates at the target key $K_T$ is a product of the probability of each edge in the authentication path, and a total confidence associated with the authentication path that terminates at the target key $K_T$ is a minimum value of the confidence values associated with each edge of the authentication path.

According to a further aspect of the invention, the method includes calculating a limit l on an amount of insurance that an owner of $K_S$ is willing to provide to a user interested in a transaction with an owner of $K_T$, and for each amount m<l, calculating a premium for which the owner of $K_S$ is willing to sell insurance to the user for an amount of m.

According to another aspect of the invention, there is provided a program storage device readable by a computer, tangibly embodying a program of instructions executable by the computer to perform the method steps for measuring trust in a transaction over a public key certificate network.

BRIEF DESCRIPTION OF THE SEVERAL VIEWS OF THE DRAWINGS

FIG. 1 illustrates a new metric, according to an embodiment of the invention.

FIG. 2 illustrates a Reiter-Stubblebine metric, according to an embodiment of the invention.

DETAILED DESCRIPTION

Figure 3:
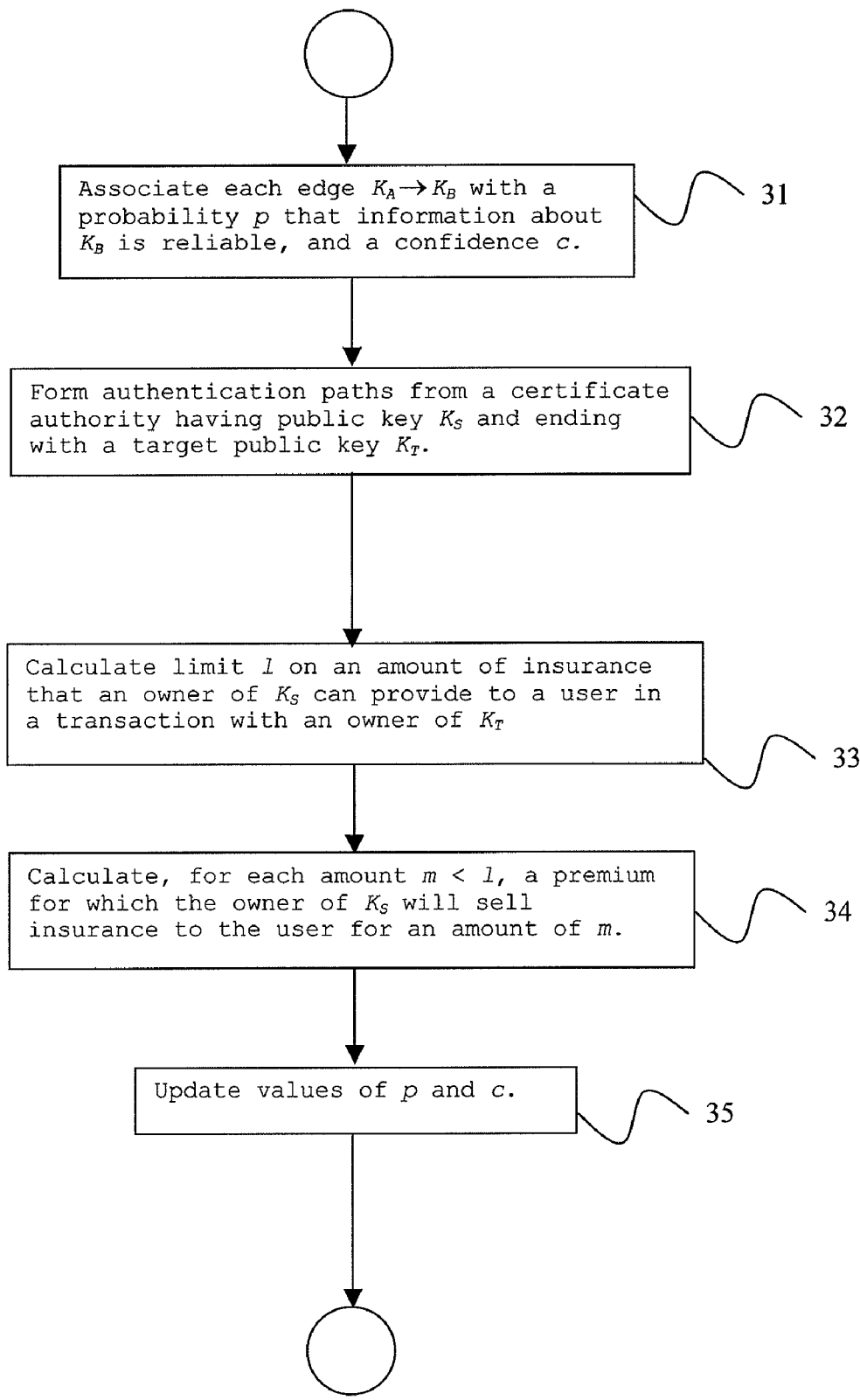
FIG. 3 is a flowchart of a method of measuring trust in a public key certificate network, according to an embodiment of the invention.

Exemplary embodiments of the invention as described herein generally include systems and methods for a new trust metric for a network of public key certificates. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

A new metric according to an embodiment of the invention is best illustrated with a sequence of examples, each more complicated than the previous. FIG. 1 is a graph illustrating a new metric according to an embodiment of the invention, with each node labeled by a public key and each edge labeled by a probability of accuracy and a confidence, described as follows. A sequence of authentications starting with a CA, e.g., with public key $K_S$, and ending with a target public key $K_T$, can be represented by a line graph, with nodes being the public keys of the entities involved, and the directed edges representing signatures. Each edge, say from $K_A$ to $K_B$, is also labeled with information which is associated with $K_B$, and signed with secret key corresponding to $K_A$. For example, this information may include the name B of the business associated with key $K_B$. The information also includes a pair of values $p(K_A, K_B)$ and $c(K_A, K_B)$, called the probability of accuracy, and the confidence, respectively. The $K_A$ and $K_B$ will be dropped when they are clear from context. The value p represents the probability, according to A, that the information about $K_B$ is reliable, including $K_B$'s owner's ability to recommend other entities and its ability to protect the key $K_B$ etc. Note that "the probability is according to A" means that A has determined an underlying probability space, and it is in this space that A has estimated the probability. In absence of any other information then, conditioned on the fact that owner A of $K_A$ is fully reliable, $p(K_A, K_B)$ represents the best estimate about the probability of accuracy of information associated with $K_B$. If the line graph has an edge from $K_S$ to $K_A$, then it can be formally shown that $p(K_S, K_A)p(K_A, K_B)$ is the probability (according to S) of B being reliable, in absence of any other paths of edges between S and B. In this manner, S can calculate the probability (according to S itself) that the target T associated with $K_T$, and its information is reliable. This probability, being a reliability indicator, can be used to calculate the premium S will charge to insure a certain amount of transaction with T. More details about this calculation and the underlying model will be given herein below.

However, S cannot insure an unlimited amount using this probability information, as the probability as estimated has a certain uncertainty attached to it, and here is where the confidence c comes in. As will be seen below, the probability $p(K_A, K_B)$ is estimated by A, using utility sampling. In simple terms, $c(K_A, K_B)$ is the total dollar amount of transactions which have been involved using that edge. Hence, this edge can only be used in an insurance of up to that amount, or possibly, a certain function of it. In a line graph, the minimum c value on the edges of the line graph determines the maximum amount that can be insured. For example, in the line graph in FIG. 1, represented by nodes $K_S$, $K_A$, $K_B$ and $K_T$, the maximum amount insurable is 100.

More formally, according to an embodiment of the invention, the probability value p is estimated as the mean of a second order probability. A second order probability density function is a density on first order probabilities, and this is the underpinning of belief functions. As an example, a p value of ½ could reflect both a case of no information, or a case of highly accurate information that the party being adjudged is only reliable half the time. In the former case, the variance of the second order probability is very high, whereas in the second case the variance is low. The theory will be described in more detail below.

In a more complicated example, consider multiple paths from S to the target entity T. As an example, again consider FIG. 1. Any path $P_i$ from S to T can be treated as a line graph, and the min value of c on $P_i$, denoted $c_i$, is the limit on the amount insurable using that path. For instance, using the middle path $K_S$, $K_A$, $K_B$, $K_T$, the maximum insurable value is 100, and the corresponding probability is $(1 \times 0.98 \times 0.99)$. On the other hand, using the top path $K_S$, $K_C$, $K_D$, $K_T$, the maximum insurable value is 200, with a corresponding probability of $(0.99 \times 0.99 \times 0.90)$. Now, if a user is interested in a transaction of amount only 100 with T, then he could be offered insurance based on any of these paths used to calculate the premium, or the average premium—such more complicated strategies are described below. On the other hand, if the use is interested in a transaction worth 300, the first 200 can be filled using the top path and the premium determined using the corresponding probability, and the remaining 100 filled using the middle path, or some other path. In general, the total insurable amount equals the max flow in the graph, using the c labels, and this corresponds to the metric developed by Reiter-Stubblebine using the max-flow min-cut theorem.

A flowchart summarizing a method for determining trust in a public certification network is presented in FIG. 3. The details of the steps are described in more detail below. A method according to an embodiment of the invention assumes the existence of a public key certificate network represented as a directed acyclic graph whose nodes are public keys and where an edge $K_A \rightarrow K_B$ implies an owner of public key $K_A$ is in possession of a certificate for public key $K_B$. Then, at step 31, each edge $K_A \rightarrow K_B$ of the public key certificate network connecting two public keys $K_A$, owned by A, and $K_B$, owned by B, is associated with a probability p, according to A, that information about $K_B$ is reliable, and a confidence c that is a total dollar amount of transactions which have involved using edge $K_A \rightarrow K_B$. The probability p and confidence c can be calculated using utility sampling, as described below, or, if there is insufficient data for utility sampling, the values may be initialized as described in the Boot-Strapping section, below. At step 32, one or more authentication paths are formed in the public key certificate network starting from a certificate authority having public key $K_S$ and ending with a target public key $K_T$. A limit l on an amount of insurance that an owner of $K_S$ is willing to provide to a user interested in a transaction with an owner of $K_T$ can be calculated at step 33. This limit can be calculated using the Ford-Fulkerson max-flow algorithm. At step 34, for each amount m<l, a premium is calculated for which the owner of $K_S$ is willing to sell insurance to the user for an amount of m. Finally, at step 35, the p and c values can be updated One potential issue with other metrics (e.g. as in PGP) is that some of the paths and trust values may be dependent. For example, in FIG. 1, the owner of $K_C$ (owner of $K_D$) may be same as $K_A$ (same as $K_B$ respectively), maliciously or otherwise. In a model according to an embodiment of the invention, the end user does not care, as he/she gets the insurance at a fair premium. The premium is fair because there may be several CA's providing a market. It is up to S to determine that the owners of $K_A$ and $K_C$, e.g. A and C, are the same or different. Even if it is determined that they are the same, a model according to an embodiment of the invention can incorporate the fact that S has assessed both A and C separately while obtaining the values $(p(K_S, K_A), c(K_S, K_A))$ and $p(K_S, K_C), c(K_S, K_C))$.

The Reiter-Stubblebine Model and Metric

A Reiter Stubblebine (RS-) metric, illustrated in FIG. 2, operates on a directed acyclic graph. The nodes in the graph are public keys, and the edge $K_A \rightarrow K_B$ exists in the graph if the user is in possession of a certificate that assigns attributes, including an owner, to $K_B$, and whose signature can be verified using $K_A$. Each edge is labeled with the attributes included in the certificate that the edge represents. It is assumed that the attributes in a certificate are consistent.

Each edge $K_A \rightarrow K_B$ also has a numeric label that represents the amount of money for which the owner of $K_A$ insures the attributes and integrity of $K_B$. In other words, it is the value for which the owner of $K_A$ will be liable to the user if the attributes bound to $K_B$ in the certificate are incorrect, or if the private key, corresponding to $K_B$, is used to mislead the user, intentionally or otherwise. It is also natural to assume that the numeric label is part of the certificate.

The metric is best described using the example in FIG. 2. If the attributes bound to $K_T$, the target public key, turn out to be false, the owners of $K_D$, $K_B$, and $K_E$ are each liable to the user for the amount of 200, 600 and 100 respectively. It is also possible that when the user goes to, say the owner of $K_B$, and the owner, or its attributes as certified, turns out to be delinquent, the user is now owed by the owners of $K_A$ and $K_C$, for the amount of 100 each.

Reiter and Stubblebine show that, in a case of a false binding for the target key, the minimum insured amount is equal to the minimum capacity cut in the graph from $K_S$ to $K_T$. For example, in FIG. 2, the minimum cut as shown has value 500, and that is the minimum insured value.

Some of the salient qualities of this metric and model are as follows.

1. The user is not required to ascertain name-to-key bindings to construct the model, except for the root CA, whose name-to-key binding is reputed,
2. The final metric computed is intuitive,
3. The final metric lets the user ascertain the risk involved in using $K_T$, although this is improved upon herein below.
4. The final metric is computed easily using a Ford-Fulkerson algorithm.
5. The metric can be computed with partial information, and still give meaningful results,
6. The insurance metric allows a user to be protected from dependencies in the graph, whether they are intentional or malicious. This differentiates from other metrics, e.g. the metric used in PGP. In PGP, a target key binding is deemed reliable if two marginally reliable keys are authenticating it. However, those two keys may belong to the same marginally reliable person, i.e. the edges are highly dependent. In Reiter and Stubblebine, if there were two such authentications from the same person, the person is liable for both edges in case of a failure.

Reiter and Stubblebine mention that the metric could also include trust values, and then use only those edges which transcend a certain trust value. However, no specifics are given. The authors also mention that their metric does not address some real world issues, such as the insurance premium, determining liable parties, and recovery of funds. In fact, since the metric just computes a total insured value, regardless of the value of a transaction, a user is left to ascertain the risk involved in undertaking this transaction. One could argue that the user should not undertake a transaction if its value is a certain multiple of the insured value, and should go ahead and do the transaction if the value is less than this threshold. Clearly in such a situation, the insurance premium for a different valued transaction should be different. For example, if the minimum insured value turns out to be a $10,000, then if the user is only doing a transaction worth $1000, he should pay a correspondingly lower premium.

Thus, it is the rate of insurance which a user needs to know to assess risk, rather than the total insurable amount, and the Reiter-Stubblebine model does not provide that. A metric according to an embodiment of the invention resolves the rate of insurance needed to assess risk, while providing a sound and intuitive underlying model of trust.

A New Model and Metric

A model according to an embodiment of the invention shares many properties with the Reiter-Stubblebine (RS) model, and can in fact be seen as an extension, although there are fundamental differences. As in the RS-model, a metric according to an embodiment of the invention operates on a directed acyclic graph, with the nodes in the graph being public keys. An edge $K_A \rightarrow K_B$ exists in the graph if the user is in possession of a certificate that assigns attributes, including the exclusive owner(s), to $K_B$, and whose signature can be verified using $K_A$. Each edge is labeled by the attributes included in the certificate that the edge represents. Each edge is also labeled with two numeric values p and c, whose significance will be pointed out below.

There maybe multiple source nodes in the graph, and only those source nodes in which the user has complete trust are of interest, including the binding of information to the source public key. The various source nodes can be seen as providing alternative metrics of use to the end user, and possibly a market for the metrics.

In the graph of FIG. 1, there is a target node, e.g. $K_T$, and the end user is interested in a transaction with the owner of $K_T$. The metric calculation enables the end user to determine the risk involved in the transaction, or alternatively, in the trust to place in the transaction.

A model according to an embodiment of the invention assumes that all the attributes in any certificate are consistent. For simplicity of presentation, assume that for each node, the information attributed to it, other than p and c, by various incoming edges is the same. This is not a limitation of a model according to an embodiment of the invention, but is there only to simplify the exposition. Thus it can be assumed that the attributes are labeled on the nodes, whereas the p and c values are labels on the edges. Moreover, assume that at the end of each transaction it can be determined, unambiguously for the end user and the source node, whether any of the attributes in the certificates involved were falsified. Here are a few examples of attributes in certificates:

Web Address=www.xxx.com;
Name and Physical Address=N and A;
Dun and Bradstreet Solvency Rating=A (i.e. a third party rating value); and
The business associated with this public key WILL deliver.

For each transaction with the owner of $K_T$, and each source node $K_S$, a metric according to an embodiment of the invention provides a limit l on the amount of insurance that owner of $K_S$ is willing to provide to the end user, and for each amount m<l, the metric provides a premium for which the owner of $K_S$ is willing to sell insurance to the end-user for an amount of m.

Note that, even if the end user is not interested in buying the insurance, or even if $K_S$ is not in the business of selling insurance, the metric can be calculated by all parties regardless, and hence provides a good metric of the risk involved in the transaction. Of course, as will be seen below, the values p and c may reflect actual values more accurately, if monetary transactions or reputations are involved.

Calculating a Metric

Consider an algorithm to compute the upper limit on the insurable amount. This value is calculated based solely on the c labels of the edges. This upper limit is the maximum $K_S$-$K_T$ flow in the directed graph, with the capacity on each edge being the c value of the edge. By the max-flow min-cut theorem, this maximum flow is equal to the minimum capacity of the $K_S$ to $K_T$ cut of the c-labeled graph. For example, in FIG. 1, the min-cut is as depicted by the curved line, and its value is 500, which is also the max-flow in the graph. These values can be computed efficiently using the Ford-Fulkerson max-flow algorithm. There can be variations on this limit calculating algorithm, where the maximum amount insurable is some function of the max-flow.

Now, consider what the c values on the edges are supposed to represent. The c value on each edge $K_A \rightarrow K_B$ is the total dollar amount of transactions that have ever been insured involving this edge. In effect, if the c value is too low, the variance in the probability estimate is so high that it is not practical to determine a good premium for insurance. So, a natural upper bound on the insurance amount is c, or some multiple of it. Hence, for any path from $K_S$ to $K_T$, the maximum amount insurable should be the minimum c value on that path. By the same reasoning, the maximum amount insurable using the whole directed graph should be the maximum flow in the graph, with a capacity bound on each edge being its c label.

Note that if the amount to be insured is much smaller than the maximum amount insurable, one may choose a variation where not all paths are considered, and a rough estimate on the premium suffices, usually with the benefit of the doubt going to the end user. This will become more apparent when the premium calculation is described, which comes next. In general, a premium calculation algorithm according to an embodiment of the invention can become a complex optimization task. But, for most purposes, simplicity in the algorithm maybe more of a determining choice than the optimal premium value, regardless of whether the premium is optimal from the end user's perspective or $K_S$'s perspective.

So, a simple variation of a premium calculating algorithm according to an embodiment of the invention performs the following. Assume that the maximum flow f (equivalent to limit l on the amount of insurance that owner of $K_S$ is willing to provide to the end user) has been determined, based on the c labels, and that all the paths with non-zero flow are determined. For each such path $P_i$, assume the flow attributed to the path is $f_i$, with the sum being f. For each path $P_i$, calculate the probability of accuracy $p_i$ to be the product of the p labels on edges of the path. For example, in FIG. 1, if the path is $K_S$, $K_A$, $K_B$, $K_T$, then the probability of accuracy of this path is 1×0.98×0.99. Assume that for each dollar amount to be insured using this path $P_i$, there is a formula for calculating the premium based on the probability $p_i$. For example, let $s_i$ be the price (selling price) of the premium, and $a_i$ be the amount that S, the owner of $K_S$, pays to A, the owner of $K_A$ for insuring $\delta_i$ fraction of the amount. Also, assume that S expects a $\gamma$ fraction expected profit per transaction. Then, $$(s_i - a_i)p_i - (1-\delta_i)(1-p_i) = \gamma_i.$$

Now, this formula is only for the source node S, and there are two quantities $s_i$ and $a_i$. $a_i$ is the amount node S pays to its immediate successor, say $A_i$, on path $P_i$. $s_i$ is the premium amount S charges the client or buyer, who is the one initiating the whole transaction. For the node $A_i$, a similar situation arises, and for this node, $s_i$ will be the $a_i$ paid from its predecessor node S, and $a_i$ will be the amount that node $A_i$ pays to it's successor, and so forth.

More specifically, since, the value $a_i$ is calculated inductively down the path from S to T, one first calculates the value $a_i$ at the bottom of the path. The quantity $a_i$ is the amount paid to the entity down one link in the path for insuring a $\delta_i$ fraction. So, $a_i$ is not the price per unit amount, but price for $\delta_i$ fraction of unit, whereas, $s_i$ is the price charged for unit amount.

So, to reflect this in the formula, assume that $b_i$ is the price or premium per unit insured amount that a node pays to the node next to it. Then the above formula would read:

$$(s_i - b_i \delta_i)p_i - (1-\delta_i)(1-p_i) = \gamma.$$

To be more precise, let the path $P_i$ be $V_{i1}, V_{i2}, \ldots, V_{im}$, where $V_{i1}$ is S and $V_{im}$ is T. Let $b_{ij}$ be the premium "unit" price $V_{ij}$ pays $V_{i(j+1)}$, and let $b_{i0}$ be the premium that the customer pays to the top node, i.e. $V_{i1}$ (=S). In other words, $b_{i0}$ is $s_i$. Also, let $p_{ij}$ be the probability of accuracy on the edge $V_{ij}$ to $V_{i(j+1)}$. Then, the accuracy of the path from $V_{ij}$ to $V_{im}$ (for all j=1 to m−1) would be $p_{ij} \times p_{i(j+1)} \times \ldots \times p_{i(m-1)}$. Call this quantity $q_{ij}$. Now the formula for pricing looks like:

$$(b_{i(j-1)} - b_{ij}\delta_{ij})q_{ij} - (1-\delta_{ij})(1-q_{ij}) = \gamma$$

and this formula holds for all j=1 to m. When one sets j=m in the above, one obtains, because $\delta_{im}=0$, as no insurance is obtained at the last link:

$$b_{i(m-1)}q_{i(m-1)} - (1-q_{i(m-1)}) = \gamma$$

and hence $b_{i(m-1)}$ is obtained from $q_{i(m-1)}$ and $\gamma$. So, now one can inductively calculate the rest and $b_{i0}$ will yield $s_i$.

Thus the value $a_i$ is determined inductively, for each node along the path $P_i$, and in fact towards the bottom end of the chain of authentication edges, the $\delta_i$ value could be zero. For example, A may not buy further insurance from B, and B may just be in a service contract with A. In case of failure of B or some node below B, the reputation of B goes down and he/she risks losing the service contract. Note that the above formula is exemplary and non-limiting, and in other embodiments of the invention, there are other ways the calculation of the premium $s_i$ can be performed based on probability $p_i$ and the path $P_i$.

Thus, for each path $P_i$, there is a maximum amount insurable, $f_i$, and the rate of insurance premium $s_i$. Next, the paths are sorted in increasing order of rate $s_i$. If a user wants to insure an amount u<f (note that u is equivalent to the amount m<l, above), then the first $f_1$ dollars out of u are insured according to $P_1$ using rate $s_1$, and the next $f_2$ dollars are insured using path $P_2$ using rate $s_2$, and so forth till all the u dollars are allocated.

According to an alternative embodiment of the invention, the first $f_1$ dollars can be insured at the average premium rate (over all i), and the next $f_2$ dollars can be insured at the average premium rate excluding $s_1$, and so forth. This alternative represents the estimates of risk more accurately, especially if there are negative recommendations, e.g. p values less than ½.

Updating the p and c Values

The way the paths $P_i$ are used to calculate the requisite premiums provides a way for the entities to improve their estimates on the probability of accuracy p, as well as c. Thus, if a path $P_i$ was used to provide insurance for amount $f_i$, each edge in the path can use this as a sample of size $f_i$ for its probability estimation. Note that there is no hard and fast rule, and the entities may have their own way of weighting positive and negative samples. In fact, the entities may have their own completely different estimation mechanism, and this mechanism according to an embodiment of the invention is provided only as a guide.

While the node attesting the target node may be estimating the probability of a binary hypothesis, the intermediate nodes are attesting the probability of success itself of the next node. For example, in FIG. 1, the node $K_A$ is estimating the accuracy of B to be 0.98. This accuracy of B includes its attestation that owner of $K_T$ is reliable with probability 0.99. However, the estimation of $p(K_A, K_B)$ can be done as follows. Let $K_{T1}, \ldots, K_{Tn}$ be the list of all public keys and their attributes that B is attesting, and let the (p, c) values estimated by B about $K_{Ti}$ be $(p_i, c_i)$. Then after a time period, where for each i, A attested $T_i$ via B using $\Delta c_i$ additional samples (dollar amounts), and $\Delta r_i$ of the samples showed positive behavior by $T_i$, the new value of $p(K_A, K_B)$ (in short $p_A^{new}$) is given by $$p_A^{new} = \frac{p_A^{old} \sum_i \Delta c_i \left(1 - \left|1 - \frac{\Delta r_i p_i}{\Delta c_i}\right|\right)}{c_A^{old} + \sum_i \Delta c_i},$$

$$c_A^{new} = c_A^{old} + \sum_i \Delta c_i.$$

Boot-Strapping

One may ask, how the initial values $p_A$ and $c_A$ are arrived at. If one follows a model according to an embodiment of the invention strictly, the $p_A$ value can be set to ½, however the $c_A$ value also gets set to zero, as there has been no transaction ever with agent A. This may, however, preclude A from getting any business. However, there can be a simple engineering approximation to this, by setting $c_A$ to a minimal value, say 100. In a more intelligent system, profiling can be used to initially (and even later) inherit p and c values from one agent to another.

Utility Sampling

Let h be a binary hypothesis that is true with probability $p \in [0, 1]$. A second order probability (SOP) density function f is a function such that $$f(p) \geq 0,$$

$$\int_0^1 f(p) \, dp = 1.$$

Thus a second order probability density function is a density on the first order probability p. SOP density functions are used in modeling situations where the first order probability p is not known precisely.

Assume that to start with, an agent A does not have any experience with the hypothesis h. One can model this by assuming that for the agent A the a priori distribution, $\psi_0(p)$ on p is uniform. If the agent A then makes $r_1$ positive and $s_1$ negative observations of the hypothesis h, then the posteriori probability density of p is given by (see the Appendix for details):

$$\psi_1(p = \theta \mid r_1, s_1) = \frac{\Gamma(r_1 + s_1 + 2)}{\Gamma(r_1 + 1)\Gamma(s_1 + 1)} \theta^{r_1} (1 - \theta)^{s_1}, \quad (1)$$

where $r_1, s_1 \geq 0$ and $\Gamma$ is the gamma function. It is not difficult to derive (see Appendix) that if the agent subsequently makes $r_i$ positive and $s_i$ negative observations of the hypothesis h in the time interval i, then the posteriori probability density of p is given by $$\psi_i(p = \theta \mid r_j, s_j, 1 \leq j \leq i) = \frac{\Gamma(r + s + 2)}{\Gamma(r + 1)\Gamma(s + 1)} \theta^r (1 - \theta)^s, \quad (2)$$

where $$r = \sum_{j=1}^i r_j \text{ and } s = \sum_{j=1}^i s_j.$$

Note that the posteriori probability densities $\psi_i(\,)$ are beta distributions. In addition, the total number of observations r+s, and the fraction r/(r+s) have sufficient statistics for estimating the parameter p. Specifically, the mean of p is given by $$E[p \mid r_j, s_j, 1 \leq j \leq i] = \int_0^1 \theta \psi_i(\theta \mid r_j, s_j, 1 \leq j \leq i) \, d\theta \quad (3)$$

$$= \frac{r + 1}{r + s + 2}$$

while the variance of p is given by $$V[p \mid r_j, s_j, 1 \leq j \leq i] = \frac{(r + 1)(s + 1)}{(r + s + 2)^2 (r + s + 3)}. \quad (4)$$

In a model of network of authentications according to an embodiment of the invention, each edge of the graph is annotated by the pair $$(p, c) = \left(\frac{r + 1}{r + s + 2}, r + s\right).$$

It can be verified that (p, c) together provide sufficient statistics to specify the posteriori density of p. This notation has an intuitive appeal, as the first element of the pair denotes the mean of the SOP density function, and the second element denotes the total number of experiences, positive or negative. Note that as c=(r+s) increases, the variance decreases, and hence improves confidence in the first element of the pair. Note also that for large values of r and s, the first parameter can be approximated by r/(r+s).

These two parameters can be readily estimated in different circumstances. For example, if two agents are engaged in monetary transactions, then the second parameter can be put equal to the total amount of money involved in these transactions, while the first parameter can be put equal to the fraction of money involved in transactions whose outcome was positive, as defined by the concerned agent, hence the name utility sampling.

Appendix: Beta Distributions and Their Properties

The following integral plays a crucial part in deriving many properties of the beta distribution.

$$\int_0^1 x^r (1-x)^s dx = \frac{s}{r+1} \int_0^1 x^{r+1} (1-x)^{s-1} dx \quad (5)$$

$$= \frac{s!}{(r+1)(r+2)\ldots(r+s)} \int_0^1 x^{r+s} dx$$

$$= \frac{s! r!}{(s+r+1)!} = \frac{\Gamma(s+1)\Gamma(r+1)}{\Gamma(s+r+2)}.$$

In the above derivation, second step follows from integration by parts by making a substitution $u=(1-p)^s$ and $$v = \frac{p^{r+1}}{r+1}.$$

Using EQ. (5), one can derive the mean and variance of the beta densities. Specifically, the mean of the SOP density function $\psi(p|r,s)$ is given by $$E[p] = \int_0^1 \theta \psi(\theta|r,s) d\theta$$

$$= \int_0^1 \theta \frac{\Gamma(r+s+2)}{\Gamma(r+1)\Gamma(s+1)} \theta^r (1-\theta)^s d\theta$$

$$= \frac{\Gamma(r+s+2)}{\Gamma(r+1)\Gamma(s+1)} \int_0^1 \theta^{r+1} (1-\theta)^s d\theta$$

$$= \frac{\Gamma(r+s+2)\Gamma(s+1)\Gamma(r+1)}{\Gamma(r+1)\Gamma(s+1)\Gamma(s+r+3)}$$

$$= \frac{r+1}{r+s+2}.$$

Similarly, one can derive that the variance of a beta distribution is given by $$V[p|r_j, s_j, 1 \le j \le i] = \int_0^1 (\theta - E[p|r_j, s_j, 1 \le j \le i])^2$$

$$\psi_i(r_j, s_j, 1 \le j \le i) d\theta$$

$$= \frac{(r+1)(s+1)}{(r+s+2)^2(r+s+3)}.$$

By Bayesian rule of probabilities, one obtains $$\psi_i(p|A_j, 1 \le j \le i) = \frac{\psi_{i-1}(\theta|A_j, 1 \le j \le (i-1))Pr(A_i|p=\theta)}{Pr(A_i)}$$

-continued $$= \frac{\binom{r_i+s_i}{r_i} \theta^{r_i}(1-\theta)^{s_i}}{\int_0^1 \binom{r_i+s_i}{r_i} x^{r_i}(1-x)^{s_i} dx}$$

$$= \frac{\binom{r_i+s_i}{r_i} \theta^{r_i}(1-\theta)^{s_i}}{r_i+s_i+1}$$

$$= \frac{\Gamma(r_i+s_i+2)}{\Gamma(r_i+1)\Gamma(s_i+1)} \theta^{r_i}(1-\theta)^{s_i}.$$

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 4:
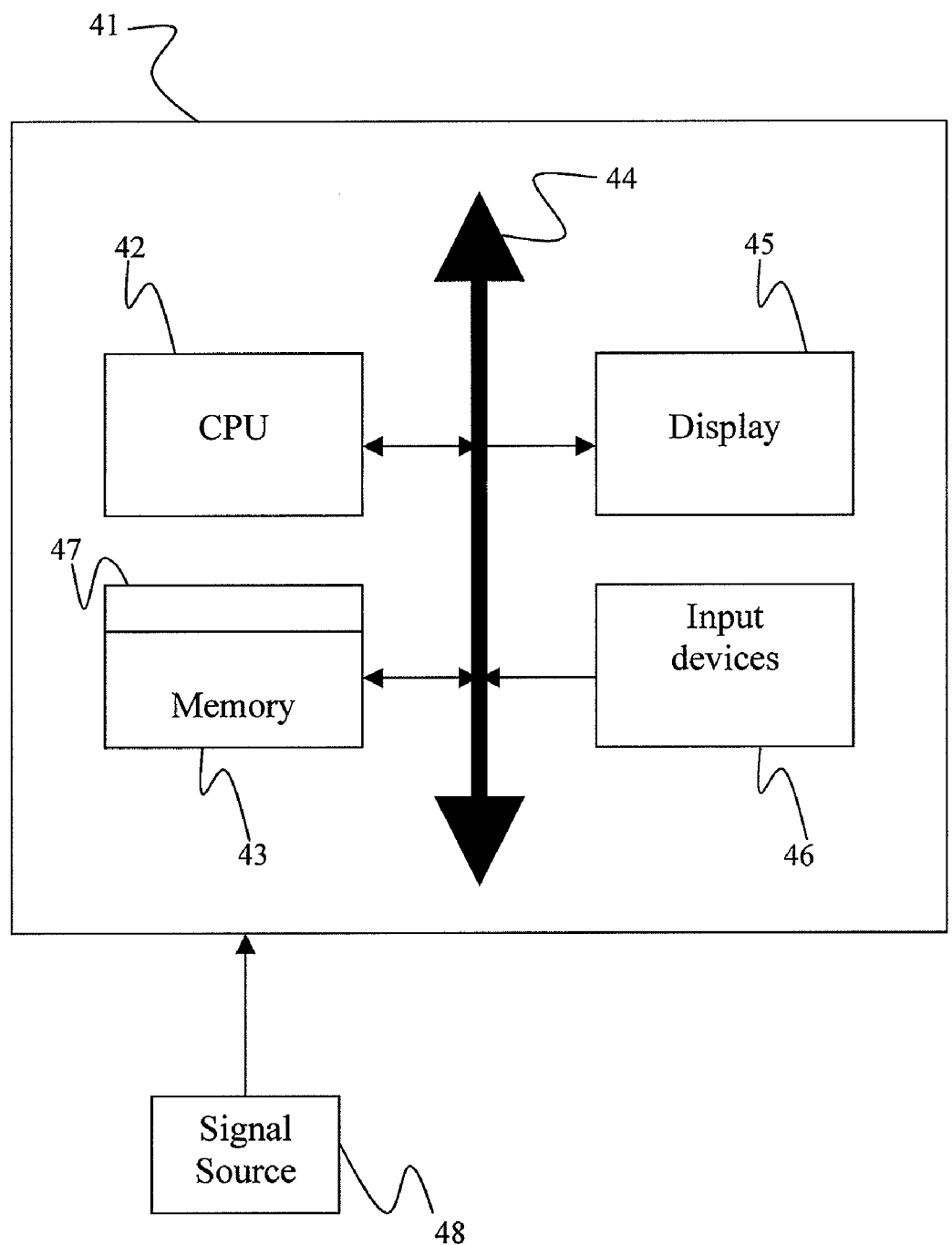
FIG. 4 is a block diagram of an exemplary computer system for implementing a new trust metric for a public key certificate network, according to an embodiment of the invention.

FIG. 4 is a block diagram of an exemplary computer system for implementing a new trust metric for a network of public key certificates according to an embodiment of the invention. Referring now to FIG. 4, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer implemented method for measuring trust in a transaction over a public key certificate network, the method performed by the computer comprising the steps of:
- providing a public key certificate network comprising a directed acyclic graph whose nodes are public keys and wherein an edge $K_A \rightarrow K_B$ implies an owner of public key $K_A$ is in possession of a certificate for public key $K_B$;
- associating each edge $K_A \rightarrow K_B$ of said public key certificate network connecting two public keys $K_A$, owned by A, and $K_B$, owned by B, with a probability p, according to A, that information about $K_B$ is reliable, and a confidence c that is a total dollar amount of transactions which have involved using edge $K_A \rightarrow K_B$;
- forming one or more authentication paths in said public key certificate network starting from a certificate authority having public key $K_S$ and ending with a target public key $K_T$;
- calculating a limit l on an amount of insurance that an owner of $K_S$ is willing to provide to a user interested in a transaction with an owner of $K_T$; and
- for each amount m<l, calculating a premium for which the owner of $K_S$ is willing to sell insurance to said user for an amount of m, by
  - calculating a maximum amount insurable, $f_i$, for each authentication path i, and
  - calculating an insurance premium rate $s_i$ for each authentication path by calculating, for each public key node in said authentication path, starting at $K_S$, $s_i$ from a formula $$(s_i - a_i)p_i - (1-\delta_i)(1-p_i) = \gamma,$$

wherein $p_i$ is a probability of accuracy for each authentication path i, $S_i$ is the selling price of said premium, $a_i$ is an amount that S, the owner of $K_S$, pays to A, the owner of $K_A$ for insuring $\delta_i$, fraction of the amount, and $\gamma$ is a fraction expected profit per transaction expected by S, and wherein for each subsequent public key node $A_i$ in said authentication path, the associated $s_i$, will be the $a_i$, paid from $A_i$'s predecessor node and the $a_i$, will be the amount paid to $A_i$'s successor node.

2. The method of claim 1, wherein said probability p and confidence c associated with each edge $K_A \rightarrow K_B$ are calculated using utility sampling.

3. The method of claim 2, wherein using utility sampling comprises A acquiring over a time interval r positive observations and s negative observations of a reliability of information provided by B, wherein said edge probability $$p = \left(\frac{r+1}{r+s+2}\right)$$

and said edge confidence c=r+s.

4. The method of claim 1, wherein a total probability associated with an authentication path that terminates at said target key $K_T$ is a product of the probability of each edge in said authentication path, and a total confidence associated with said authentication path that terminates at said target key $K_T$ is a minimum value of the confidence values associated with each edge of said authentication path.

5. The method of claim 1, wherein calculating said limit l on an amount of insurance for said one or more authentication paths ending with target public key $K_T$ comprises calculating a maximum $K_S$-$K_T$ flow f in said directed graph, with a flow capacity on each edge being the c value of the edge.

6. The method of claim 5, wherein calculating a premium for each amount m<l further comprises:

sorting the authentication paths in increasing order of rate $S_i$, wherein said authentication paths are labeled $P_1$ to $P_n$ in increasing order of rate $s_i$ wherein n is a number of authentication paths; and
calculating said premium for said amount m<l from said sorted premium rates $S_i$.

7. The method of claim 6, wherein calculating said premium for said amount m<l comprises insuring a first $f_1$ dollars out of m according to $P_1$ using rate $s_1$, and insuring subsequent amounts using each successive path $P_i$ using rate $s_i$ until all m dollars are allocated.

8. The method of claim 6, wherein calculating said premium for said amount m<l comprises insuring a first $f_1$ dollars out of m at an average premium rate over all paths $P_i$, and insuring subsequent amounts an average premium rate excluding a rate associated with the amount already insured, until all m dollars are allocated.

9. The method of claim 1, further comprising: providing a list $K_{T1}, \ldots, K_{Ti}, \ldots, K_{Tn}$ of all public keys that B is attesting, wherein $(p_i, c_i)$ are the (p, c) values estimated by B about $K_{Ti}$;
having A attest $T_i$ for each i via B after a time period using $\Delta c_i$ additional samples wherein $\Delta r_i$ of the samples show positive behavior by $T_i$; and
updating the probability associated with each edge $K_A \rightarrow K_B$ from $$p_{K_A \rightarrow K_B} \leftarrow \frac{p_{K_A \rightarrow K_B} + \sum_i \Delta c_i \left(1 - \left|1 - \frac{\Delta r_i p_i}{\Delta c_i}\right|\right)}{c_{K_A \rightarrow K_B} + \sum_i \Delta c_i},$$

and the confidence associated with each edge $K_A \rightarrow K_B$ from $$c_{K_A \rightarrow K_B} \leftarrow c_{K_A \rightarrow K_B} + \sum_i \Delta c_i.$$

10. A computer implemented method for measuring trust in a transaction over a public key certificate network, the method performed by the computer comprising the steps of:
- providing a public key certificate network comprising a directed acyclic graph whose nodes are public keys and wherein an edge $K_A \rightarrow K_B$ implies an owner of public key $K_A$ is in possession of a certificate for public key $K_B$;
- associating each edge $K_A \rightarrow K_B$ of said public key certificate network connecting two public keys $K_A$, owned by A, and $K_B$, owned by B, with a probability p, according to A, that information about $K_B$ is reliable, and a confidence c that is a total dollar amount of transactions which have involved using edge $K_A \rightarrow K_B$;
- using utility sampling to estimate p and c by having A acquire over a time interval r positive observations and s negative observations of a reliability of information provided by B, wherein said edge probability $$p = \left(\frac{r+1}{r+s+2}\right)$$

and said edge confidence c=r+s;
- forming one or more authentication paths in said public key certificate network starting from a certificate authority having public key $K_S$ and ending with a target public key $K_T$; and calculating a limit l on an amount of insurance that an owner of $K_S$ is willing to provide to a user interested in a transaction with an owner of $K_T$, and for each amount m<l, calculating a premium for which the owner of $K_S$ is willing to sell insurance to said user for an amount of m by calculating an insurance premium rate $S_i$ for each authentication path $P_i = V_{i1}, V_{i2}, \ldots, V_{im}$, wherein $V_{i1}$ is a starting node S associated with public key $K_S$ and $V_{im}$ is target node T associated with public key $K_T$ by inductively calculating, for each public key node in said authentication path, starting at $K_S$, $s_i$ from a formula $$(b_{i(j-1)} - b_{ij}\delta_{ij})q_{ij} - (1-\delta_{ij})(1-q_{ij}) = \gamma$$

wherein $b_{ij}$ is the premium per unit insured amount price $V_{ij}$ pays $V_{i(j+1)}$, and $b_{i0}$ is the premium $S_i$ that the customer pays to the top node $V_{i1} = S$, $q_{ij} = p_{ij} \times p_{i(j+1)} \times \ldots \times p_{i(m-1)}$ is the accuracy of the path from $V_{ij}$ to $V_{im}$ for all j=1 to m−1 where $p_{ij}$ is the probability of accuracy on the edge $V_{ij}$ to $V_{i(j+1)}$, wherein when j=m, $\delta_{im} = 0$ and $$b_{i(m-1)} = \frac{(1 - q_{i(m-1)}) + \gamma}{q_{i(m-1)}}.$$

11. The method of claim 10, wherein a total probability associated with an authentication path that terminates at said target key $K_T$ is a product of the probability of each edge in said authentication path, and a total confidence associated with said authentication path that terminates at said target key $K_T$ is a minimum value of the confidence values associated with each edge of said authentication path.

12. A program storage device readable by a computer, tangibly embodying a program of instructions executable by the computer to perform the method steps for measuring trust in a transaction over a public key certificate network, the method comprising the steps of:

providing a public key certificate network comprising a directed acyclic graph whose nodes are public keys and wherein an edge $K_A \rightarrow K_B$ implies an owner of public key $K_A$ is in possession of a certificate for public key $K_B$;

associating each edge $K_A \rightarrow K_B$ of said public key certificate network connecting two public keys $K_A$, owned by A, and $K_B$, owned by B, with a probability p, according to A, that information about $K_B$ is reliable, and a confidence c that is a total dollar amount of transactions which have involved using edge $K_A \rightarrow K_B$;

forming one or more authentication paths in said public key certificate network starting from a certificate authority having public key $K_S$ and ending with a target public key $K_T$;

calculating a limit l on an amount of insurance that an owner of $K_S$ is willing to provide to a user interested in a transaction with an owner of $K_T$; and for each amount m<l, calculating a premium for which the owner of $K_S$ is willing to sell insurance to said user for an amount of m, by calculating a maximum amount insurable, $f_i$, for each authentication path i, and calculating an insurance premium rate $s_i$ for each authentication path by calculating, for each public key node in said authentication path, starting at $K_S$, $s_i$, from a formula $$(s_i - a_i)p_i - (1-\delta_i)(1-p_i) = \gamma,$$

wherein $p_i$ is a probability of accuracy for each authentication path i, $s_i$ is the selling price of said premium, $a_i$ is an amount that S, the owner of $K_S$, pays to A, the owner of $K_A$ for insuring $\delta_i$ fraction of the amount, and $\gamma$ is a fraction expected profit per transaction expected by S, and wherein for each subsequent public key node $A_i$ in said authentication path, the associated $s_i$ will be the $a_i$ paid from $A_i$'s predecessor node and the $a_i$ will be the amount paid to $A_i$'s successor node.

13. The computer readable program storage device of claim 12, wherein said probability p and confidence c associated with each edge $K_A \rightarrow K_B$ are calculated using utility sampling.

14. The computer readable program storage device of claim 13, wherein using utility sampling comprises A acquiring over a time interval r positive observations and s negative observations of a reliability of information provided by B, wherein said edge probability $$p = \left(\frac{r+1}{r+s+2}\right)$$

and said edge confidence c=r+s.

15. The computer readable program storage device of claim 12, wherein a total probability associated with an authentication path that terminates at said target key $K_T$ is a product of the probability of each edge in said authentication path, and a total confidence associated with said authentication path that terminates at said target key $K_T$ is a minimum value of the confidence values associated with each edge of said authentication path.

16. The computer readable program storage device of claim 12, wherein calculating said limit l on an amount of insurance for said one or more authentication paths ending with target public key $K_T$ comprises calculating a maximum $K_S$–$K_T$ flow f in said directed graph, with a flow capacity on each edge being the c value of the edge.

17. The computer readable program storage device of claim 16, wherein calculating a premium for each amount m<l comprises:

sorting the authentication paths in increasing order of rate $s_i$, wherein said authentication paths are labeled $P_1$ to $P_n$, in increasing order of rate $s_i$, wherein n is a number of authentication paths; and calculating said premium for said amount m<l from said sorted premium rates $s_i$.

18. The computer readable program storage device of claim 17, wherein calculating said premium for said amount m<l comprises insuring a first $f_1$ dollars out of m according to $P_1$ using rate $s_1$, and insuring subsequent amounts using each successive path $P_i$, using rate $s_i$ until all m dollars are allocated.

19. The computer readable program storage device of claim 17, wherein calculating said premium for said amount m<l comprises insuring a first $f_1$ dollars out of m at an average premium rate over all paths $P_i$, and insuring subsequent amounts an average premium rate excluding a rate associated with the amount already insured, until all m dollars are allocated.

20. The computer readable program storage device of claim 12, the method further comprising:

providing a list $K_{T1}, \ldots, K_{Ti}, \ldots, K_{Tn}$ of all public keys that B is attesting, wherein $(p_i, c_i)$ are the (p, c) values estimated by B about $K_{Ti}$;

having A attest $T_i$ for each i via B after a time period using $\Delta c_i$ additional samples wherein $\Delta r_i$ of the samples show positive behavior by $T_i$; and updating the probability associated with each edge $K_A \rightarrow K_B$ from $$p_{K_A \rightarrow K_B} \leftarrow \frac{p_{K_A \rightarrow K_B} + \sum_i \Delta c_i \left(1 - \left|1 - \frac{\Delta r_i p_i}{\Delta c_i}\right|\right)}{c_{K_A \rightarrow K_B} + \sum_i \Delta c_i},$$

and the confidence associated with each edge $K_A \rightarrow K_B$ from $$c_{K_A \rightarrow K_B} \leftarrow c_{K_A \rightarrow K_B} + \sum_i \Delta c_i.$$

21. A program storage device readable by a computer, tangibly embodying a program of instructions executable by the computer to perform the method steps for measuring trust in a transaction over a public key certificate network, the method comprising the steps of:

providing a public key certificate network comprising a directed acyclic graph whose nodes are public keys and wherein an edge $K_A \rightarrow K_B$ implies an owner of public key $K_A$ is in possession of a certificate for public key $K_B$;

associating each edge $K_A \rightarrow K_B$ of said public key certificate network connecting two public keys $K_A$, owned by A, and $K_B$, owned by B, with a probability p, according to A, that information about $K_B$ is reliable, and a confidence c that is a total dollar amount of transactions which have involved using edge $K_A \rightarrow K_B$;

using utility sampling to estimate p and c by having A acquire over a time interval r positive observations and s negative observations of a reliability of information provided by B, wherein said edge probability $$p = \left(\frac{r+1}{r+s+2}\right)$$

and said edge confidence c=r+s;

forming one or more authentication paths in said public key certificate network starting from a certificate authority having public key $K_S$ and ending with a target public key $K_T$; and calculating a limit 1 on an amount of insurance that an owner of $K_S$ is willing to provide to a user interested in a transaction with an owner of $K_T$, and for each amount m<l, calculating a premium for which the owner of $K_S$ is willing to sell insurance to said user for an amount of m by calculating an insurance premium rate $s_i$ for each authentication path $P_i = V_{i1}, V_{i2}, \ldots, V_{im}$, wherein $V_{i1}$ is a starting node S associated with public key $K_S$ and $V_{im}$ is target node T associated with public key $K_T$ by inductively calculating, for each public key node in said authentication path, starting at $K_S$, $s_i$ from a formula $$(b_{i(j-1)} - b_{ij}\delta_{ij})q_{ij} - (1-\delta_{ij})(1-q_{ij}) = \gamma$$

wherein $b_{ij}$ is the premium per unit insured amount price $V_{ij}$ pays $V_{i(j+1)}$, and $b_{i0}$ is the premium $S_i$ that the customer pays to the top node $V_{i1} = S$, $q_{ij} = p_{ij} \times p_{i(j+1)} \times \ldots \times p_{i(m-1)}$ is the accuracy of the path from $V_{ij}$ to $V_{im}$ for all j=1 to m−1 where $p_{ij}$ is the probability of accuracy on the edge $V_{ij}$ to $V_{i(j+1)}$, wherein when j=m, $\delta_{im} = 0$ and $$b_{i(m-1)} = \frac{(1 - q_{i(m-1)}) + \gamma}{q_{i(m-1)}}.$$

22. The computer readable program storage device of claim 21, wherein a total probability associated with an authentication path that terminates at said target key $K_T$ is a product of the probability of each edge in said authentication path, and a total confidence associated with said authentication path that terminates at said target key $K_T$ is a minimum value of the confidence values associated with each edge of said authentication path.

* * * * *